United States Patent
Arce et al.

(10) Patent No.: US 10,614,540 B2
(45) Date of Patent: Apr. 7, 2020

(54) SYSTEM AND METHOD FOR EMBEDDING A TWO DIMENSIONAL CODE IN VIDEO IMAGES

(71) Applicant: Graphiclead LLC, Newark, DE (US)

(72) Inventors: Gonzalo R. Arce, Newark, DE (US); Gonzalo J. Garateguy, Framingham, MA (US); Daniel L. Lau, Lexington, KY (US); Sean Xiaolu Wang, Wilmington, DE (US)

(73) Assignee: GraphicLead LLC, Newark, DE (US)

( * ) Notice: Subject to any disclaimer, the term of this patent is extended or adjusted under 35 U.S.C. 154(b) by 232 days.

(21) Appl. No.: 15/570,983

(22) PCT Filed: Apr. 28, 2016

(86) PCT No.: PCT/US2016/029734
§ 371 (c)(1),
(2) Date: Oct. 31, 2017

(87) PCT Pub. No.: WO2016/178896
PCT Pub. Date: Nov. 10, 2016

(65) Prior Publication Data
US 2019/0043151 A1 Feb. 7, 2019

Related U.S. Application Data

(60) Provisional application No. 62/155,730, filed on May 1, 2015, provisional application No. 62/165,619, filed on May 22, 2015.

(51) Int. Cl.
*G06T 1/00* (2006.01)
*G06K 19/06* (2006.01)

(52) U.S. Cl.
CPC ...... *G06T 1/0028* (2013.01); *G06K 19/06037* (2013.01); *G06K 19/06103* (2013.01);
(Continued)

(58) Field of Classification Search
None
See application file for complete search history.

(56) References Cited

U.S. PATENT DOCUMENTS

| 5,726,435 A | 3/1998 | Hara et al. |
| 7,950,589 B2 | 5/2011 | Oouchi |

(Continued)

FOREIGN PATENT DOCUMENTS

| EP | 1973330 A1 | 9/2008 |
| WO | 2013043534 A1 | 3/2013 |

(Continued)

OTHER PUBLICATIONS

Analoui et al., "Model Based Halftoning Using Direct Binary Search", SpIE, vol. 1666 Human Vision, Visual Processing and Digital Display III, 1992, pp. 96-108.

(Continued)

*Primary Examiner* — Bernard Krasnic
(74) *Attorney, Agent, or Firm* — RatnerPrestia (57) ABSTRACT

Disclosed are a method and apparatus for embedding a graphic representation into a two dimensional matrix code by modifying the luminance of individual pixels in the image according the values of a provided QR code image. The modified luminance values are determined by an optimization procedure which minimizes a visual distortion metric with respect to the original graphic representation while maintaining the value of a model for the probability of decoding and detection error below a specified limit.

18 Claims, 7 Drawing Sheets

(52) U.S. Cl.
CPC ............. *G06T 2201/0051* (2013.01); *G06T 2201/0065* (2013.01); *G06T 2201/0202* (2013.01)

(56) References Cited

U.S. PATENT DOCUMENTS

| | | | |
|---|---|---|---|
| 8,144,922 | B2 | 3/2012 | Kawabe et al. |
| 8,851,392 | B2 | 10/2014 | Shinotani et al. |
| 8,950,685 | B1* | 2/2015 | Lin .................. G06K 5/02 235/494 |
| 8,978,989 | B2 | 3/2015 | Friedman et al. |
| 9,865,027 | B2* | 1/2018 | Arce .................. G06T 1/0021 |
| 2010/0195834 | A1 | 8/2010 | Amagai |
| 2013/0021364 | A1 | 1/2013 | Azuma et al. |
| 2013/0026239 | A1 | 1/2013 | Sakahashi et al. |
| 2013/0026241 | A1 | 1/2013 | Sakahashi et al. |
| 2013/0112760 | A1 | 5/2013 | Schory et al. |
| 2013/0221105 | A1 | 8/2013 | Cheong et al. |
| 2014/0144996 | A1 | 5/2014 | Friedman et al. |
| 2014/0175179 | A1* | 6/2014 | Carter .............. G06K 19/06037 235/494 |
| 2014/0263666 | A1 | 9/2014 | Prince |
| 2015/0254486 | A1* | 9/2015 | Shigemitsu .......... G06F 3/005 235/462.11 |

FOREIGN PATENT DOCUMENTS

| | | |
|---|---|---|
| WO | 2013124837 A1 | 8/2013 |
| WO | 2014002086 A2 | 1/2014 |

OTHER PUBLICATIONS

Baharav et al., "Visually Significant QR Codes: Image Blending and Statistical Analysis", 2013 IEEE International Conference on Multimedia and Expo (ICME), San Jose, CA—6 Pages, 2013.
Bertsekas, D. "Nonlinear Programming, Second Edition", Athena Scientific, Belmont, Massachusetts, 1995, 366 Pages.
Brink et al., "Minimum Cross-Entropy Threshold Selection", Pattern Recognition, vol. 29, No. 1, pp. 179-188, 1996.
Byrd et al., "A Trust Method Based on Interior Point Techniques for Nonlinear Programming", http://hal.inria.fr/inria-00073794—44 pages, date: 2006.
Chu et al., "Halftone QR Codes" in ACM Transactions on Graphics, vol. 32, No. 6, Article 217, Nov. 2013—8 Pages.
Cox, R., "QArt Codes" Apr. 2012. [Online] Available http://research.swtch.com/qart, posted Apr. 12, 2012—8 Pages.
Fang et al., "An Optimization Model for Aesthetic Two-dimensional Barcodes", Multimedia Modeling—Lecture Notes in Comuter Science, vol. 8325, pp. 278-290, date: 2014.
Fujita et al., "Expansion of Image Displayable Area in Design QR Code and Its Application", In Forum on Information Technology, pp. 517-520 (2011).
Garateguy et al., "Voronoi Tessellated Halftone Masks", Proceedings of the 2010 IEEE 17th International Conference on Image Processing, Sep. 26-29, 2010, pp. 529-532.
Garateguy et al., "QR Images: Optimized Image Embedding in QR Codes", IEEE Transactions on Image Processing, vol. 23, No. 7, Jul. 2014, pp. 2842-2853.
International Search Report and Written Opinion for International Application No. PCT/US2015/028757, dated Sep. 2, 2015—12 pages.
International Search Report and Written Opinion for International Application No. PCT/US2016/029734, dated Jul. 27, 2016—12 Pages.
International Standard ISO/IEC 18004, First Edition, "Information Technology—Automatic Identification and Data Capture Techniques—Bar Code Symbology—QR Code", Jun. 15, 2000—122 Pages.
James, F., "A Review of Pseudorandom Number Generators", Computer Physics Communications 60.3, Dec. 1988—17 Pages (1990).
Lau et al., "Blue- and Green-Noise Halftoning Models, A Review of the Spatial and Spectral Characteristics of Haltone Textures", IEEE Signal Processing Magazine, Jul. 2003, pp. 29-38.
Lau et al., "Digital Halftoning by Means of Green-Noise Masks", J. Opt. Soc. Am. A, vol. 16, No. 7, Jul. 1999, pp. 1575-1586.
Lau et al., "Digital Color Halftoning with Generalized Error Diffusion and Multichannel Green-Noise Masks", IEEE Transactions on Image Processing, vol. 9, No. 5, May 2000, pp. 923-935.
Lau et al., "Modern Digital Halftoning" Second Edition, 3 Pages (Abstract Only), 2008.
Lau et al., "Green Noise Digital Halftoning", Proceeding of the IEEE, vol. 86, No. 12, Dec. 1988, pp. 2424-2444.
Lin et al., "Appearance-Based QR Code", IEEE Transactions on Multimedia, vol. 15, No. 8, Dec. 2013, pp. 2198-2207.
Lin et al., "Artistic QR Code Embellishment" Computer Graphics Forum, vol. 32, Issue 7, pp. 137-146, Oct. 2013.
Nasanen, R., "Visibililty of Halftone Dot Textures", IEEE Transaction on Systems, Man, and Cybernetics, vol. SMC-14, No. 6, Nov./Dec. 1984, pp. 920-924.
Niblack, W., "An Introduction to Digital Image Processing", First Edition, 1985, Chapter 5.0 Segmentation, pp. 113-127.
Ono et al., "Two-Dimensional Barcode Decoration Based on Real-Coded Genetic Algorithm", 2008 IEEE Congress on Evolutionary Computation (CEC 2008), pp. 1068-1073.
Otsu, N, "A Threshold Selection Method from Gray-Level Histograms", IEEE Transactions on Systems, Man, and Cybernetics, vol. SMC-9, No. 1, Jan. 1979, pp. 62-66.
Rodriguez et al., "Blue-Noise Multitone Dithering", IEEE Transaction on Image Processing, vol. 17, No. 8, Aug. 2008, pp. 1368-1382.
Samretwit et al., "Measurement of Reading Characteristics of Multiplexed Image in QR Code", 2011 Third International Conference on Intelligent Networking and Collaborative Systems, pp. 552-557.
Sauvola et al., "Adaptive Document Image Binarization", Pattern Recognition, vol. 33 (2000), pp. 225-236.
Soon, T., "Section 3 QR Code" Synthesis Journal 2008, Section 3, pp. 59-78.
Stevenson et al., "Binary Display of Hexagonally Sampled Continuous-Tone Images", J. Opt. Soc. Am. A, vol. 2, No. 7, Jul. 1985, pp. 1009-1013.
Trussell et al., "Color Image Processing (Basics and Special Issue Overview)", IEEE Signal Processing Magazine (14), Jan. 2005—9 Pages.
Ulichney, R., "The Void-and-Cluster Method for Dither Array Generation", SPIE vol. 1913, pp. 332-343.
Visual Lead; Kaedan Capitoal Investment Group, Apr. 2012 [online' available at http://www.visualead.com/ [accessed Jul. 2013], pp. 1-5.
Wakahara et al., "Image Processing of 2-Dimensional Barcode", 2011 International Conference on Network-Based Information Systems, pp. 484-490.
Wang et al., "Image Quality Assessment: From Error Visibility to Structural Similarity", IEEE Transactions on Image Processing, vol. 13, No. 4, Apr. 2004, pp. 1-14.
Yang et al., "Binarization of Low-Quality Barcode Images Captured by Mobile Phones Using Local Windows of Adaptive Location and Size", IEEE Transactions on Image Processing, vol. 21, No. 1, Jan. 2012, pp. 418-425.
Zhou et al., "Research on Binarization of QR Code Image", 2010 International Conference on Multimedia Technology, Oct. 29-31, 2010—4 pages.
Zxing library, Open Source QR code generation software library https://code.google.com/p/zxing/ [retriefed on Aug. 21, 2015], 3 pages.

* cited by examiner

SYSTEM AND METHOD FOR EMBEDDING A TWO DIMENSIONAL CODE IN VIDEO IMAGES

CROSS-REFERENCE TO RELATED APPLICATIONS

This is the national phase of International Application No. PCT/US2016/029734, filed 28 Apr. 2016, which claims priority to U.S. Provisional Application No. 62/155,730, entitled SYSTEM AND METHOD FOR EMBEDDING A TWO DIMENSIONAL CODE IN VIDEO IMAGES, filed 1 May 2015 and U.S. Provisional Application No. 62/165,619, entitled METHOD FOR PRODUCING A SET OF QR CODES WITH VISUAL IMAGE INFORMATION, filed 22 May 2015. The disclosure of each of these applications is incorporated herein by reference in its entirety for all purposes.

BACKGROUND

Two dimensional codes are used in various situations to provide information to a user having a device capable of decoding the two dimensional code. The two dimensional code may include various types of information, such as information identifying characteristics and/or ownership of an object, such as piece of furniture, a delivery address of a product being shipped, or a Uniform Resource Locator (URL) for accessing information via a computer network.

Typically, the two dimensional code is placed at a location on an object, such as a display device, a sign, a photograph, a video or a document, separate from any textual or graphical content (i.e. wording, artwork, photograph, video or graphics) that may be included on the object. Use of separate locations for graphical content and the two dimensional codes consumes space on the object that may be better used to provide even more graphical or textual content and/or space that may be used for more prominent brand identification.

It would beneficial to combine both textual or graphical content and two dimensional codes in a manner that does not diminish the aesthetic attributes of the textual or graphical content and also enables efficient decoding of the two dimensional code.

SUMMARY

The present examples are in the field of readable matrix code fusion with a graphic representation or a plurality of graphic representations.

The method or apparatus according to the subject matter of the present example can embed a QR matrix code or a plurality of QR code matrices into a graphic representation or a plurality of graphic representations by modifying the intensity values of individual elements in the graphic representations according to the values of the provided QR code matrices. If a plurality of images is provided the present example interleaves modified elements temporally to further take advantage of the temporal and spatial masking effects of the human visual system. The modified intensity values are determined by means of an optimization procedure which minimizes a spatial and temporal visual distortion metric with respect to the original graphic representation while maintaining the value of a model for the probability of error below a specified limit.

The method proposed in this example utilizes a mechanism to select modifiable pixels in the original set of graphic representations by means of a plurality of priority matrices and pixel distribution masks generated by halftoning via blue noise masks.

For example, a method of producing a set of QR codes with visual image information in a computer processor is disclosed. The method includes receiving data to encode, stored in a first memory of the computing means, and a set of images comprising a three dimensional array stored in second memory of the computing means. A three dimensional array is generated that includes a set of 2D codes, such as QR codes, from the data stored in the first memory such that the each QR code is represented as a matrix with M rows and N columns and where each element is one of two unique (i.e., binary) values. The exemplary method generates a second three dimensional array comprising a set of K matrices with M rows and N columns where each element is defined as a function of the set of images stored in a second memory. Each of the K, M by N matrices is divided into three dimensional sub-blocks of elements with m rows, n columns and a depth index equal to k elements. A sub-set of the element values of each image sub-block is modified based upon the values of the corresponding QR code elements in the sub-block with the same element rows, columns and time index, wherein the time index is based on k. Inside a sub-block, a subset of elements from each QR code sub block is defined by the processor, and the defined subset of elements from each QR code sub block is replaced with the elements in the corresponding image sub block with the same row, column and depth index coordinates.

Another example method of producing a set of QR codes with visual image information in a computing device is disclosed. The method includes receiving data stored in a first memory of the computing device to encode along with a set of images. The images are stored as a three dimensional array in a second memory of the computing device. The three dimensional array having a set of QR codes is generated from the data stored in the first memory such that each QR code is represented as a matrix with M rows and N columns. A second three dimensional array is generated that includes a set of K matrices with M rows and N columns. Each element in the set of K matrices is defined as a function of the set of images stored in a second memory. Each of the K, M by N matrices is divided into three dimensional sub-blocks of elements with m rows, n columns and depth equal to k elements. The image elements of each image stored in the second memory is converted to a scalar value that measures each element's visual appearance according to a visual cost function $f(r,c,t)$, where r and c represent matrix row and column coordinates surrounding the subject element under consideration, and t represents the image within the set of images being considered. A subset of element values of each image matrix inside a sub-block is modified based upon the values of the corresponding QR code elements in the sub-block with the same element rows, columns and depth index. Inside a sub-block, a subset of elements from each QR code matrix are defined, and are replaced with the elements in the corresponding three dimensional image array with the same row, column and depth coordinates.

Also disclosed is a system that includes a memory and a processor. The processor when executing programming code stored in the memory, configured to perform functions for combining image data with two dimensional (2D) code data. For example, the disclosed processor is configured to producing a set of QR codes with visual image information in a computing device is disclosed. The processor is also configured to receive data stored in a first memory of the computing device to encode along with a set of images. The images are stored as a three dimensional array in a second memory of the computing device. The three dimensional array having a set of QR codes is generated from the data stored in the first memory such that each QR code is represented as a matrix with M rows and N columns. A second three dimensional array is generated that includes a set of K matrices with M rows and N columns. Each element in the set of K matrices is defined as a function of the set of images stored in a second memory. Each of the K, M by N matrices is divided into three dimensional sub-blocks of elements with m rows, n columns and depth equal to k elements. The image elements of each image stored in the second memory is converted to a scalar value that measures each element's visual appearance according to a visual cost function $f(r,c,t)$, where r and c represent matrix row and column coordinates surrounding the subject element under consideration, and t represents the image within the set of images being considered. A subset of element values of each image matrix inside a sub-block is modified based upon the values of the corresponding QR code elements in the sub-block with the same element rows, columns and depth index. Inside a sub-block, a subset of elements from each QR Code matrix are defined, and are replaced with the elements in the corresponding three dimensional image array with the same row, column and depth coordinates.

Examples of a reproduction of a QR code with visual image information are also disclosed. The QR code reproduction including a substrate bearing the visual appearance of a QR code, characterized by an ordered grid of binary values, interposed by contone-intensity values of which a subset of values have been altered to minimize the visual appearance of the binary QR code values.

BRIEF DESCRIPTION OF THE DRAWINGS

The drawing figures depict one or more implementations in accord with the present concepts, by way of example only, not by way of limitations. In the figures, like reference numerals refer to the same or similar elements.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present example.

DETAILED DESCRIPTION

The method or apparatus according to the present examples embodies a technique to embed a QR matrix code or a set of QR matrix codes into a graphic representation or a plurality of graphic representations taking advantage of the temporal and spatial masking effects of the human visual system. These graphic representations can include color, grayscale, or binary matrices or sequences of matrices. The embedding process is based on an iterative process that alternates between two stages. The first is the selection of pixels in the original graphic representation or plurality of graphic representations whose luminance are to be modified, and the second is the optimization of the luminance levels of the selected pixels in smaller subdivisions of the original graphic representations.

The method or apparatus according to the disclosed subject matter receives as inputs a plurality of graphic representations (i.e. video) or a single graphic representation (i.e. image or logo), a QR matrix code or a message that is then encoded into a matrix code or a set of matrix codes, a halftoning mask or a set of halftoning masks, and a set of parameters denoted by D=[D1, D2, . . . , Dk] which specify the size of the center region of the cells in each of the matrices. In addition to these sets of parameters, the method also takes as inputs another set of parameters Pmax= [Pmax1, . . . , Pmaxk] which specifies the maximum probability of error in the decoded message for each matrix code from the set of matrix codes.

The optimization of the intensity values of modified elements is performed on a subdivision of each of the original graphic representations or plurality of graphic representations in smaller sub blocks. The size of the sub blocks can be specified independently for each graphic representation. The original graphic representation or plurality of graphic representations, QR matrix or set of QR matrices, halftoning mask or set of halftoning masks and additional priority masks are subdivided in smaller multidimensional blocks of specified sizes.

Figure 1:
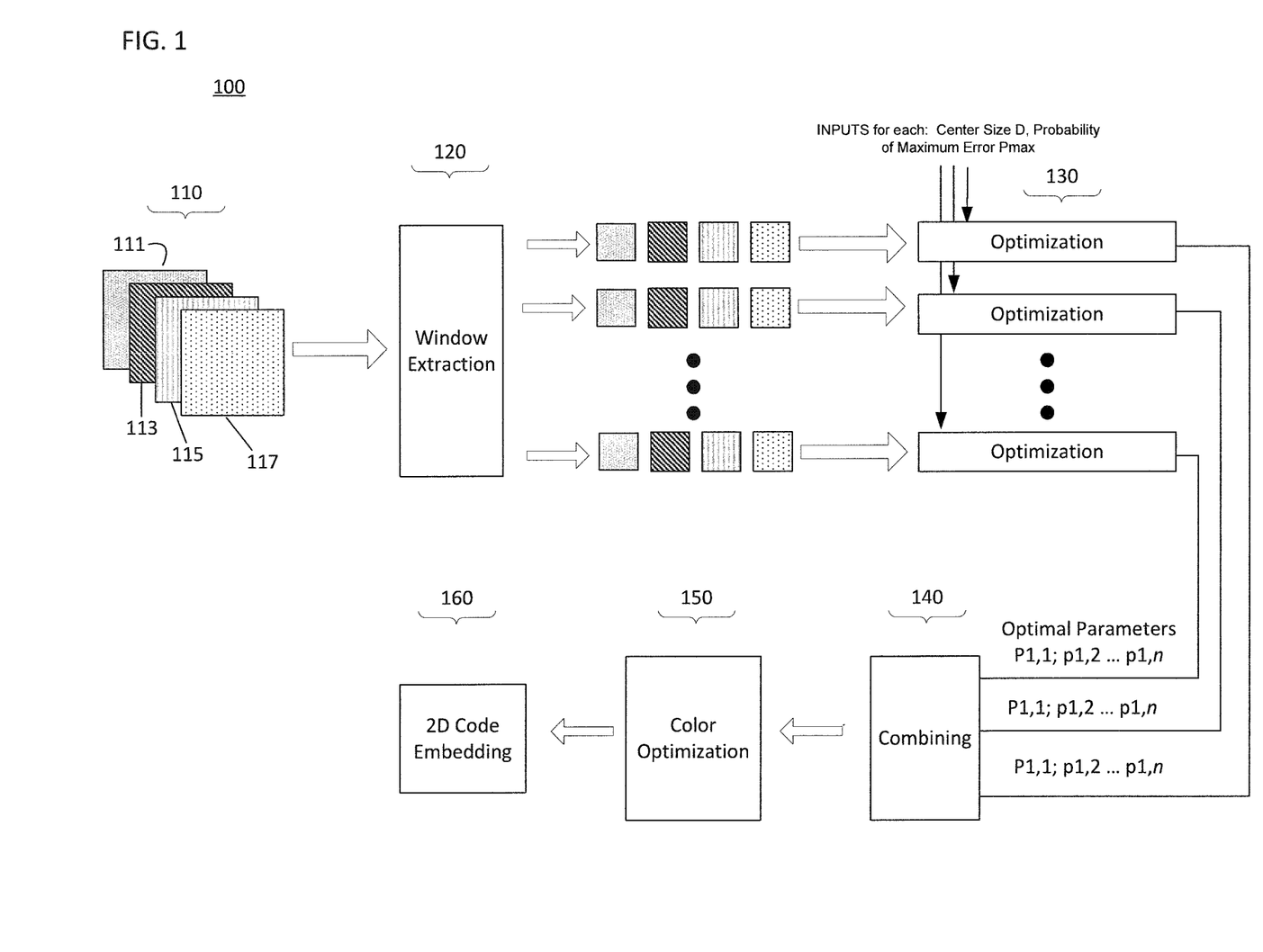
FIG. 1 depicts an example of the embedding process for a set of graphic representations and its corresponding matrix codes, halftoning masks and priority matrices.

FIG. 1 depicts an example of the embedding process for a set of graphic representations and its corresponding matrix codes, halftoning masks and priority matrices. The diagram includes the image subdivision, and intensity optimization stages, image combining, color optimization and 2D code embedding output.

The color/grayscale graphical example 100 of FIG. 1 including the image subdivision, and luminance optimization stages. The different stages of the QR embedding procedure are illustrated. For example, at 110, the inputs to the process 100 are the original color/grayscale graphic image 111, and the QR code 113, a halftone mask 115 and the priority masks (represented by $M_p$ mask 117). The original graphic image 111 and QR code 113 are divided into local windows at 120. The local windows may be optimized, at 130, independently and in parallel. The optimization at 130 provides windows optimized for the different optimization parameters such as p1,1; p1,2 to p1,$n$. The results of the optimization are combined at 140, after which the combined image may be color optimized at 150. After the color optimization, a 2D code embedded image at 160 is generated. The embedded image from 260 may be output to a printer or a display, or may be stored in a memory (as shown in other examples).

Figure 2:
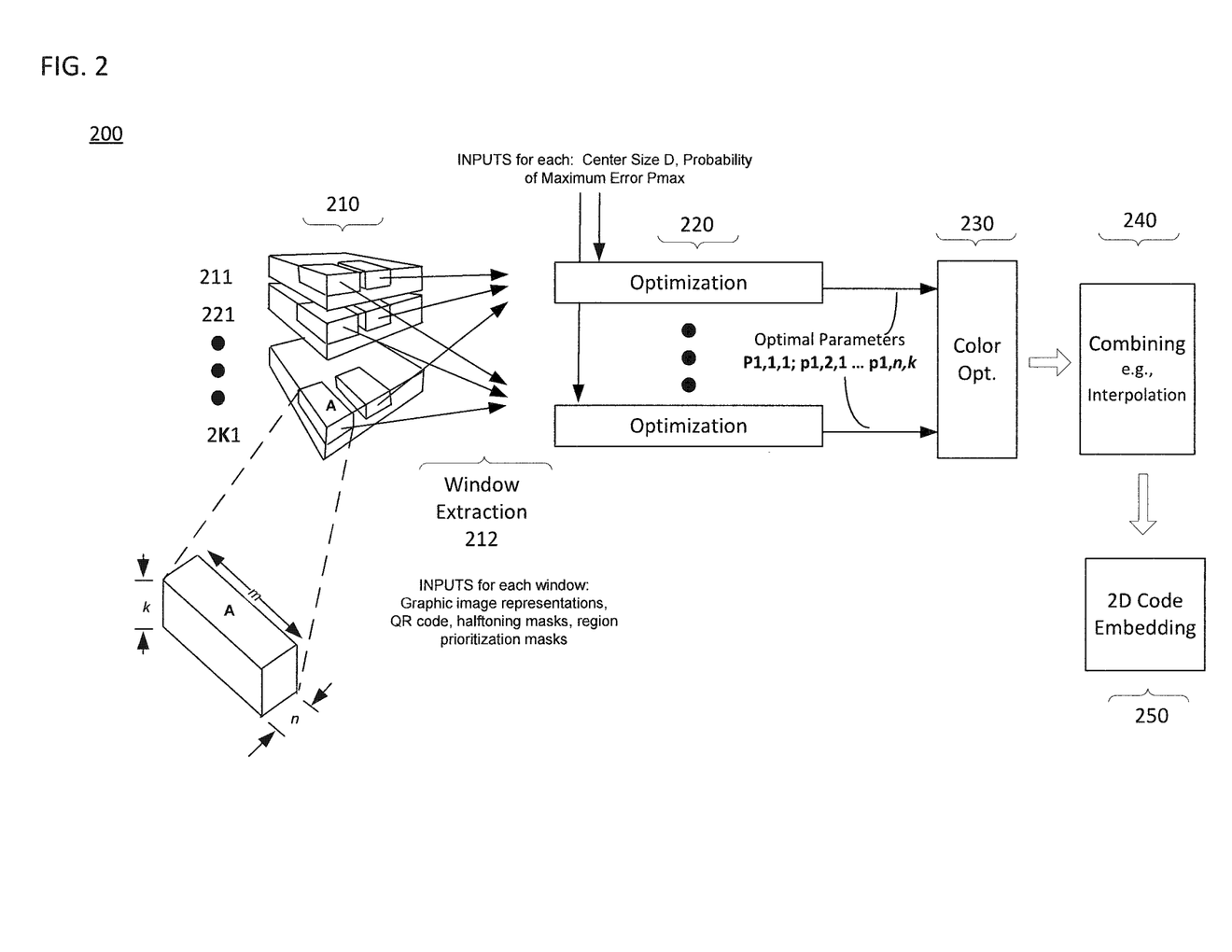
FIG. 2 depicts the concentration of central and surrounding modified pixels is determined by two parameters p1 and p2 for each sub block of each graphic representation and uniquely defines the number and location of modified pixels.

FIG. 2 also provides an example of the embedding process for a set of graphic image representations from video and its corresponding matrix codes, halftoning masks and priority matrices.

The color/grayscale graphical example 200 of FIG. 2 including the image subdivision, and luminance optimization stages but for a number of sets of a graphic images extracted from, for example, a video stream. At 210, a three dimensional block of a set of graphic image representations 211, 221, . . . 2K1 are shown. At 212, a window extraction process is executed the inputs of which are a graphic image representations, a 2D code, such as a QR code, halftoning masks and region prioritization masks. In this example, different stages of the QR embedding procedure are illustrated. The local windows are optimized, at 220, independently and in parallel. The optimization at 220 provides windows optimized for the different optimization parameters such as p1,1,1; p1,2,1 to p1,$n$,$k$. Using the optimal parameters, colors may optimized at 230, and, after the colors are optimized, the color optimized windows are combined at 240 after which the combined image may be, and a 2D code embedded image at 250 may be available. The embedded image may be output to a printer or a display, or may be stored in a memory (as shown in other examples).

Figure 3:
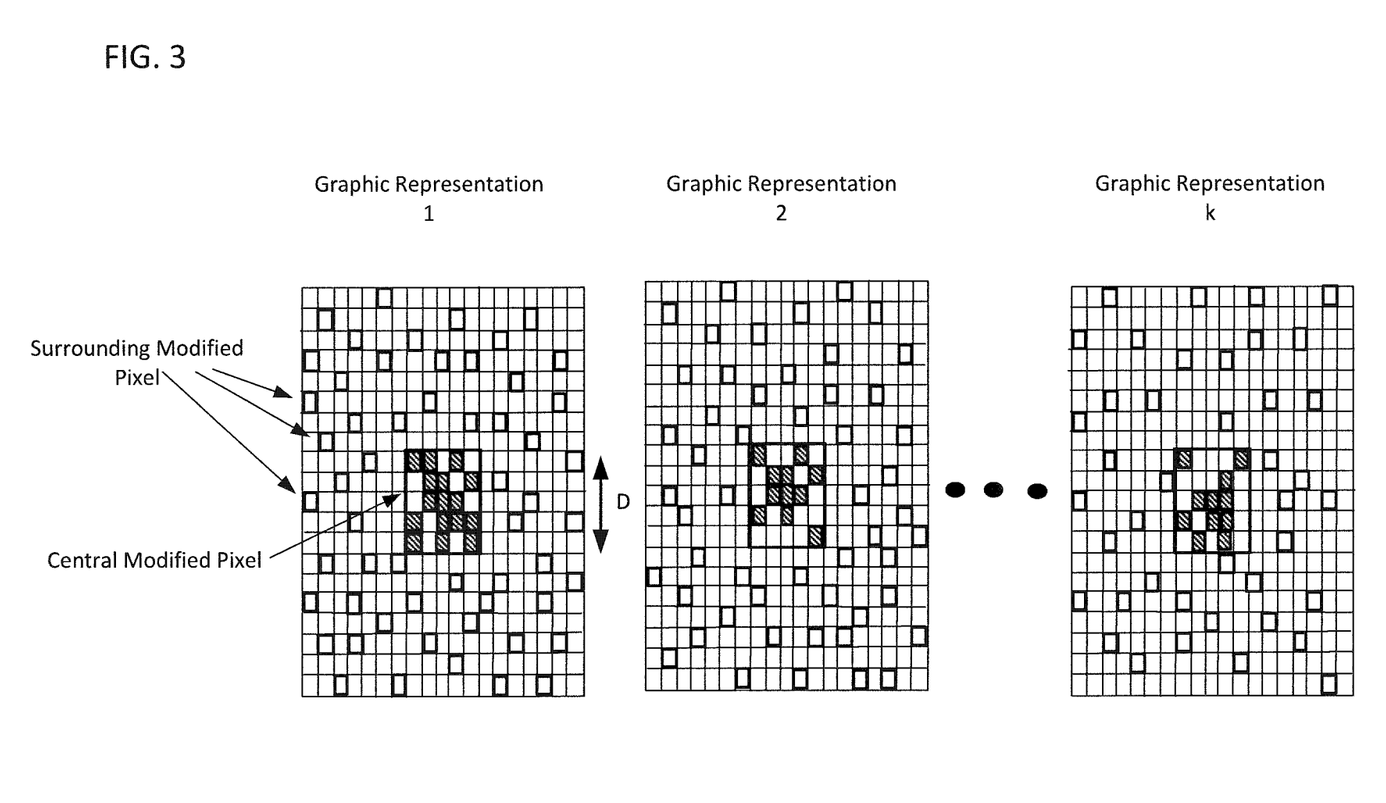
FIG. 3 depicts a concentration of central and surrounding modified pixels determined by using two parameters $p_1$ and $p_2$ for each sub block of each graphic representation and uniquely defines the number and location of modified pixels.

Modified Pixel Selection (FIG. 3)

The modified pixels in the graphic representations or plurality of graphic representations corresponding to each cell of the Matrix codes are divided into two categories: central pixels and surrounding pixels.

The selection of central pixels, in a three dimensional block of the set of graphic representations, is performed by selecting a set of pixels around the corresponding center pixel of each cell in each slice of a three dimensional block of the QR matrix codes. The set of pixels in each graphic representation of the collection of graphic representations can vary in order to minimize the visibility of modified pixels by taking advantage of the human visual system temporal and spatial masking properties. The number of pixels selected depends upon the set of input parameters D=[D1, D2, . . . , Dk] in an arbitrary way. This may include but is not limited to a circular region of diameter D pixels or a square region with D pixels in each side in which not all pixels need to be modified.

The selection of surrounding modified pixels is based on the use of a masking matrix such as a halftoning mask to generate the sensation of a smooth blending between the code and the image. A different masking matrix can be used for each graphic representation in the collection of graphic representations. The use of a set of halftoning masks allows to reduce the spatial and temporal visual impact of the embedding and minimizes the visual perception of the constituent cells of the QR code.

The concentration of central and surrounding modified pixels is determined by two parameters p1 and p2 for each sub block of each graphic representation and uniquely defines the number and location of modified pixels as depicted in FIG. 2. The exact location of modified pixels is obtained from the halftoning mask for example by thresholding a blue or green noise halftoning mask with the concentration p1 and p2 for central and surrounding pixels respectively.

Intensity Modification of Graphic Representations

For a given set of center and surrounding modified pixels their intensity levels are changed in such a way that the spatial and temporal visual similarity between the embedded and the original graphic representations is minimized. The intensity values as well as the concentration of modified pixels is optimized independently for each three dimensional sub block of the set of graphic representations, and the optimal values are determined by minimizing the spatial and temporal visual image distortion while keeping the probability of decoding error below a predefined threshold. The intensity value of the pixels in one element of the embedded set of image $Y_{i,j,t}^{out}$ at location (i,j,t) where t indicates a time or depth (or slice) index, is selected as a function of the corresponding QR code element values $q_{i,j,t}$ and the intensity of the original graphic representation $Y_{i,j,t}$. The output luminance is given by $$Y_{i,j,t}^{out} = \begin{cases} f(p_3, p_4, \ldots, p_n, q_{i,j,t}) & \text{if } (i, j, t) \text{ is modified} \\ Y_{i,j,t} & \text{otherwise} \end{cases} \quad (1)$$

where $p_3, p_4, \ldots, p_n$ is a set of n−2 intensity parameters and $f$ is a function which determines the value of the intensity of modified pixels as a function of these parameters. The parameters $p_3, p_4, \ldots, p_n$ correspond in general to intensity levels of individual pixels or groups of individual pixels as for example modified pixels corresponding to pixels in the set of QR code matrices with values 1 or 0.

In a simple example we consider 4 parameters $p_3, p_4, p_5, p_5 \in [0,1]$ and a possible function $f$ defined as $$f(\alpha_c, \beta_c, \alpha, \beta, q_{i,j,t}) = \begin{cases} p_3 & \text{if } q_{i,j,t} = 1 \\ p_4 & \text{if } q_{i,j,t} = 0 \\ p_5 & \text{if } (i, j, t) \text{ is a center pixel and } q_{i,j,t} = 1 \\ p_6 & \text{if } (i, j, t) \text{ is a center pixel and } q_{i,j,t} = 0 \end{cases} \quad (2)$$

In the general case, an independent set of luminance parameters $p_3, p_4, \ldots, p_n$ is optimized in each three dimensional sub block of the set of graphic representations. For color images the color of the embedded graphic representation is obtained by minimizing the color distance in an appropriate color space subject to constraints in the intensity values which should equal the modified intensity $Y_{i,j,t}^{out}$.

Color Optimization

Figure 4:
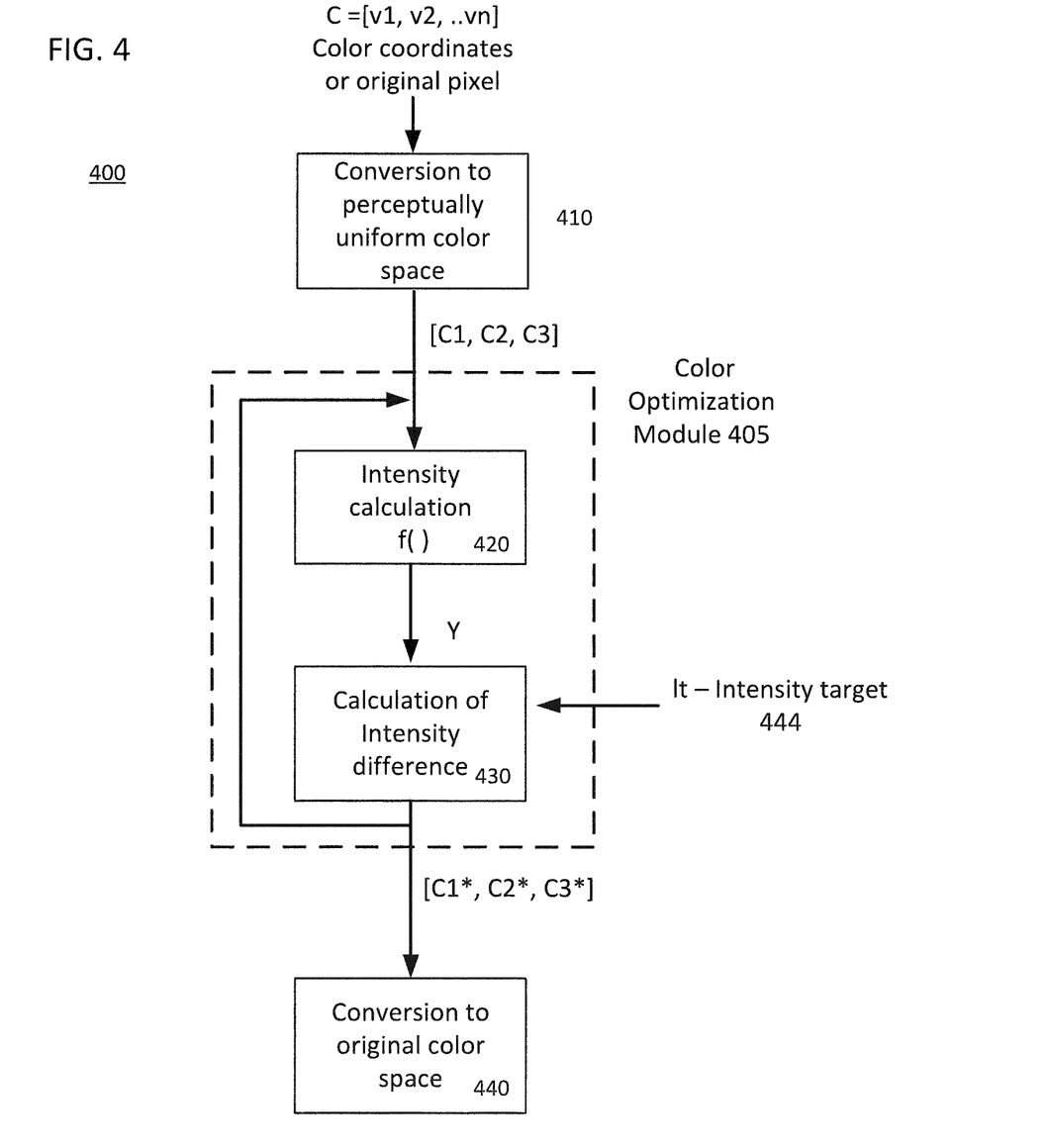
FIG. 4 illustrates the flow of the operations constituting a possible embodiment of the module that implements the color optimization process.

FIG. 4 illustrates a functional block diagram illustrating a flow of the operations constituting an example of an embodiment of the module that implements the color optimization process. The process 400 is implemented via a color optimization module 305. An initial input into the process 300 is the color coordinates of the original pixel in the original color graphic image representation, e.g., C=[v1, v2, . . . vn], where v1, v2, . . . vn, are individual color space parameter values in a particular space of the original color graphic image representation. A given intensity level corresponds to a subset of colors in the color space in which the image was designed i.e. RGB, CMYK, CMY or in general any color space. To obtain the optimal color coordinates v=($v_1, v_2, \ldots, v_n$) in the original color space for a given intensity target $I_t$, the original vector v is transformed, at 410, into an approximately perceptually uniform color space such as but not limited to HSL, Luv or Lab. Denoting each of the components in this space (C1,C2,C3) in general, the relationship between the intensity $I_t$ and the color components is given by $$I_t = F(C_1, C_2, C_3) = g(T^{-1}(C_1, C_2, C_3))$$

where $T^{-1}(C_1, C_2, C_3)$ is the backward transformation from the uniform color space to the original color space and g is a function that allows to calculate the intensity from the coordinates in the original color space (at recursive steps 420 and 430). The optimal values in the perceptually uniform space are then obtained as $$(C_1^*, C_2^*, C_3^*) = \underset{C_1, C_2, C_3}{\mathrm{argmin}} |F(C_1, C_2, C_3) - I_t|$$

Once the optimal values ($C_1^*$, $C_2^*$, $C_3^*$) are determined in color module 405, the new coordinates in the original color space are calculated by using the forward transformation between the uniform space and original space as ($v_1$, $v_2$, ..., $v_n$)=$T(C_1^*, C_2^*)$.

The target Intensity It 444 used in the color optimization corresponds to the modified luminance $Y_{i,j,t}^{out}$ obtained from the luminance optimization process.

Probability of Sampling Error Models

To ensure decodability of the embedding, a probability of error model is used to impose a constraint over the optimization of the luminance parameters. An example of a probability of error model is described here but any other model that adequately predicts the probability of decoding error can be used in the present example.

One such probability model that can be used has two components. One component corresponding to the case of sampling the center region of the QR modules and the second corresponding to sampling outside the center. The first component is the probability of detection error denoted by $P_{Derr}(p_1, p_2, p_3, p_4, \ldots, p_n)$ and defined as the probability of incorrectly recovering the value at the center of a QR code cells. The second component is the probability of binarization error denoted by $P_{Berr}(p_1, p_2, p_3, p_4, \ldots, p_n)$ which is the probability of incorrectly classify any pixel in the image outside of the center region. The global probability of error is finally calculated based on the probability of sampling error $p_s$ (i.e. the probability of incorrectly determine the center of the QR module) as $$P_{err}(p_1,p_2,p_3,p_4,\ldots,p_n)=P_{Derr}(p_1,p_2,p_3,p_4,\ldots,p_n)(1-p_s)+p_s P_{Berr}(p_1,p_2,p_3,p_4,\ldots,p_n)$$

The optimization of the intensity values of the embedding is performed such that the probability of error $P_{err}$ is below the predefined set of thresholds Pmax=[Pmax1, ..., Pmaxk] specified as inputs.

The model for the probability of binarization error $P_{Berr}$ is adapted to the procedure implemented at the decoder to binarize the intensity image acquired by the camera. An example of such a model is derived by considering that the decoder binarizes the image using a local thresholding technique where the threshold is calculated as the mean value of the image intensity in a local window $$T[m,n,k] = \frac{1}{N} \sum_{(i,j,t) \in W} Y_{i,j,t}$$

where N is the number of elements in the window W. Other thresholding methods can be also defined to consider different decoding applications or procedures.

In the case where the embedding is performed over a sequence of graphic representations, the intensity image captured by the camera $Y_{i,j}$ can be composed of the temporal superposition of several graphic representations.

In general for any binarization method based on thresholding, the probability of error model is then calculated by considering the probabilities that a particular element is classified as the opposite of its correct value in the QR code $P_{Berr}=P(Y_{m,n,t}<T[m,n,k]|q_{m,n,k}=0)P(q_{m,n,k}=0)+P(Y_{m,n,t}>T[m,n,k]|q_{m,n,k}=1)P(q_{m,n,k}=1)$.

This probability is a function of the embedding parameters $p_1$, $p_2$, $p_3$, $p_4$, ..., $p_n$ by means of the integration process in the camera which captures the combination of the intensity of several graphic representations directly influencing the value of T[m,n,k].

Similarly the probability of detection error $P_{Derr}$ is defined as the probability of incorrectly detecting the values of the QR code at the center pixel of each cell assuming this can be sampled without error and it is modeled as $$P_{Derr}=P(Y_c>T[m,n,k]|q_c=0)P(q_c=0)+P(Y_c<T[m,n,k]|q_c=1)P(q_c=1)$$

where $q_c$ is the value of the QR matrix code at the center of each cell and $Y_c$ is the value of intensity captured by the camera at the center of each cell.

Optimization of Local Intensity Levels and Concentration of Modified Pixels for Color and Grayscale Images The optimization of the embedding parameters $p_1$, $p_2$, $p_3$, $p_4$, ..., $p_n$ pursue two conflicting objectives which are the minimization of the probability of error and the maximization of the embedding visual quality. To quantify the embedding quality a cost function which considers the distance between the embedding and the original image taking into account the spatial and temporal response of the human visual system is defined. This function is denoted by $J(p_1, p_2, p_3, p_4, \ldots, p_n)$ and is a function of the embedding parameters $[p_1, p_2, p_3, p_4, \ldots, p_n]$, the set of graphic representations, the set of halftoning masks and the set of QR code matrices provided as inputs.

Different linear and non-linear functions J can be defined depending on the viewing distance, the printing or screen resolution and the quality criteria most appropriate for the application at hand.

An example of such function is the SSIMplus index or other methods based on banks of filters. The dependence with the optimization parameter is given by the dependence of the modified images with this parameters. The selected visual distortion measure is calculated between the modified and original matrices.

Parameter Optimization

The optimal embedding parameters $p_1$, $p_2$, $p_3$, $p_4$, ..., $p_n$, are found as the solution of the optimization problem $$(p_1, p_2, p_3, p_4, \ldots, p_n) = \min_{p_1, p_2, p_3, p_4, \ldots, p_n} J(p_1, p_2, p_3, p_4, \ldots, p_n) \text{ subject}$$
$$\text{to } P_{err}(p_1, p_2, p_3, p_4, \ldots, p_n) \leq P_{max}$$

Where $P_{err}$ is a model for the probability of error in the QR detector and $P_{max}$ is the maximum allowed probability of decoding error. This optimization is applied independently to each three dimensional sub block of the set of graphic representations and then the parameters are interpolated in time and space to generate a set of values for each element of the set of graphic representations. FIG. 1 presents a block diagram of this optimization process applied to different three dimensional sub blocks of the collection of graphic representations.

The quality and reliability of the optimization solutions is determined by the set of parameters Pmax=[Pmax1, ..., Pmaxk] which is one of the input parameters in addition to the set of center size D=[D1, D2, ..., Dk].

Figure 5:
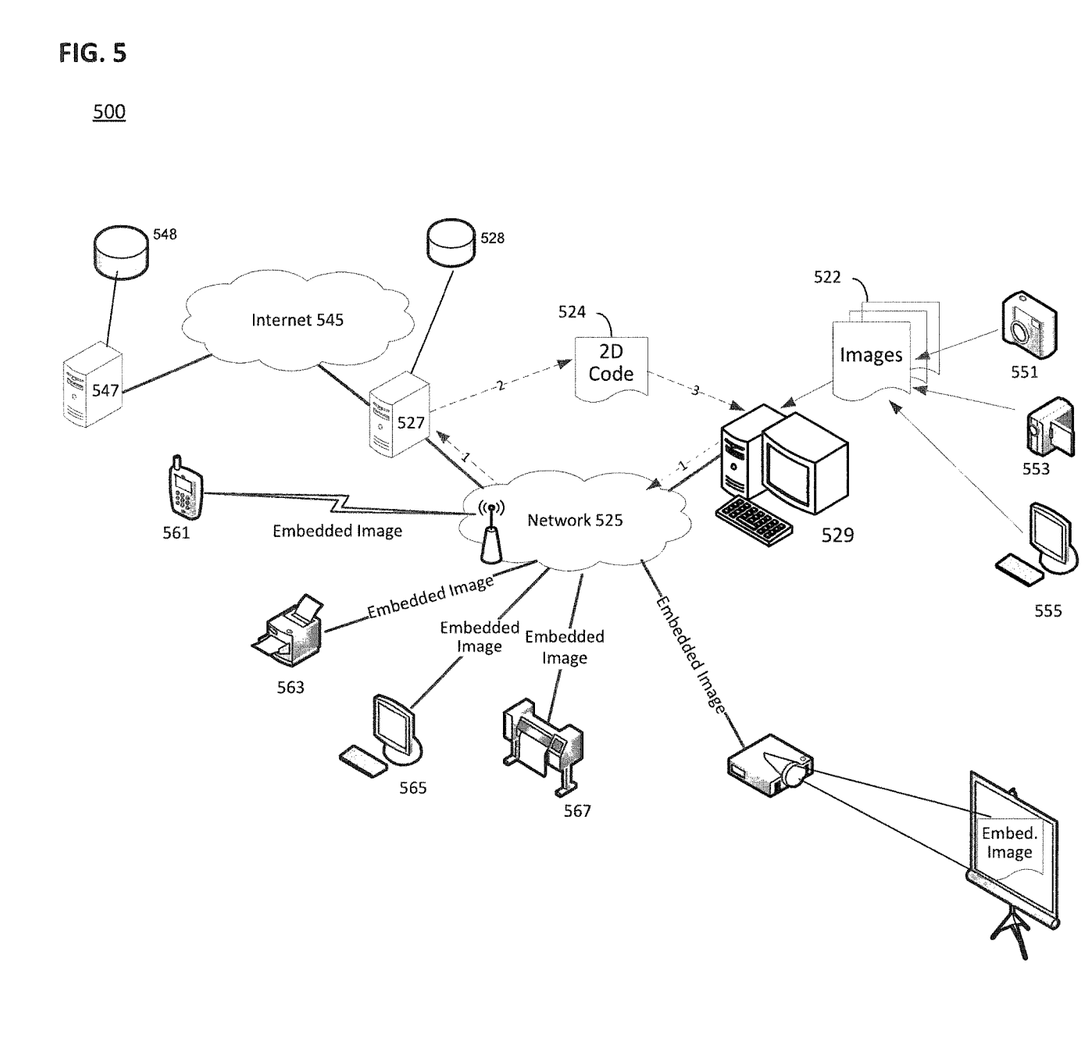
FIG. 5 illustrates an example of a system environment in which the above disclosed examples may be implemented.

FIG. 5 illustrates an example of a system environment in which the above disclosed examples may be implemented. The system environment 500 may include a user system 529, a network 525, a number of peripheral devices 561-569, a network server 527, a network data storage 528, a number of input devices 551-553, a data network 545, such as the Internet, a data network server 547, and a data network data storage 548. The user system 529 includes a processor (which is described in more detail with reference to FIGS. 9 and 10) and memory for storing data and computer program instructions related to the above described examples of generating an embedded image.

In an example described with reference to FIG. 2, the graphic image representation 522 may be obtained (as in step 210 of FIG. 2) from one or more of the input devices 551-555, such as a digital camera 551, a video camera 553, a computer system 555, a scanning device (not shown), or any other device that is capable of providing a digital graphic image representation.

The user system 529 may receive the 2D code 524 (as in step 220 of FIG. 2) from one or more sources. For example, the 2D code 524 may be stored in data storage 528, which is accessible by the user system 529 via the network 525 and network server 527. Alternatively, the 2D code 524 may be stored in the memory (not shown in this example) of the user system 529. In another alternative, a user may input a message that the user wishes to have encoded in a 2D code. A computer application that generates a 2D code based on an input message may execute on the user system 529 to provide a 2D code for generation of the embedded image. Similarly, as shown by the dashed lines, the user system 529 may receive the message, and forward (represented by dashed line 1 the message to server 527. Server 527 may execute the 2D code generation computer application, generate (represented by dashed line 2) the 2D code 524. The 2D code 524 is returned (represented by dashed line 3) to the user system 529 for generation of the embedded image. In yet another alternative, the 2D code may be retrieved from a data network data storage 548 via data network 545 and web server 547. For example, the 2D code may be stored in the data network data storage 548, or the web server 547 may be provided with the user inputted message, execute a 2D code generation computer program that encodes the message into a 2D code, and returns the generated 2D code to the user system 529 via networks 545 and 525.

After generating the embedded image (via steps 230-250 of FIG. 2), the user system 529 may forward the embedded image via a wired or wireless connection to one or more of the peripheral devices 561-569. For example, if the embedded image is to be used in an advertising flyer, the embedded image may be sent to printer 563, or if to be incorporated into a poster or other large printed matter (e.g., billboard advertisement, banner or the like) to a suitable printer/plotter 567. Alternatively, a visual display of the embedded image may be provided via smartphone 561, computer 565 or projector 569 and display surface 568. Of course, the generated embedded image may be optimized in different iterations for presentation on all of the peripheral devices 561-569. The visual display may be provided on an active display device, such as an liquid crystal display (LCD) panel, LCD projector, digital light processing (DLP) projector, organic light emitting diode (OLED) display, cathode ray tube (CRT) monitor or plasma display.

Of course other examples are contemplated, such as, the server 527, or the web server 547, being provided with the images 522 (which may be video images or a streaming video) and the 2D code 524, and generating an embedded image according to the above described examples.

As shown by the above discussion, functions relating to the described image embedding may be implemented on computers connected for data communication via the components of a packet data network, operating as a user device and/or as a server as shown in FIG. 5. Although special purpose devices may be used, such devices also may be implemented using one or more hardware platforms intended to represent a general class of user's data processing device commonly used to run "client" programming and/or a general class of data processing device commonly used to run "server" programming. The user device may correspond to user system 529 whereas the server computer may be configured to implement the embedded image generation functions discussed above.

As known in the data processing and communications arts, a general-purpose computing device, computer or computer system typically comprises a central processor or other processing device, internal data connection(s), various types of memory or storage media (RAM, ROM, EEPROM, cache memory, disk drives etc.) for code and data storage, and one or more network interfaces for communication purposes. The software functionalities involve programming, including executable code as well as associated stored data, e.g. files used for the embedded image generation service/function(s). The software code is executable by the general-purpose computer that functions as the data network server 547 or network server 527 and/or that functions as an embedded image generation user system 529. In operation, the code is stored within the general-purpose computer platform. At other times, however, the software may be stored at other locations and/or transported for loading into the appropriate general-purpose computer system. Execution of such code by a processor of the computer platform enables the platform to implement the methodology for generating an embedded image, in essentially the manner performed in the implementations discussed and illustrated herein. Although those skilled in the art likely are familiar with the structure, programming and general operation of such computer systems, it may be helpful to consider some high-level examples.

Figure 6:
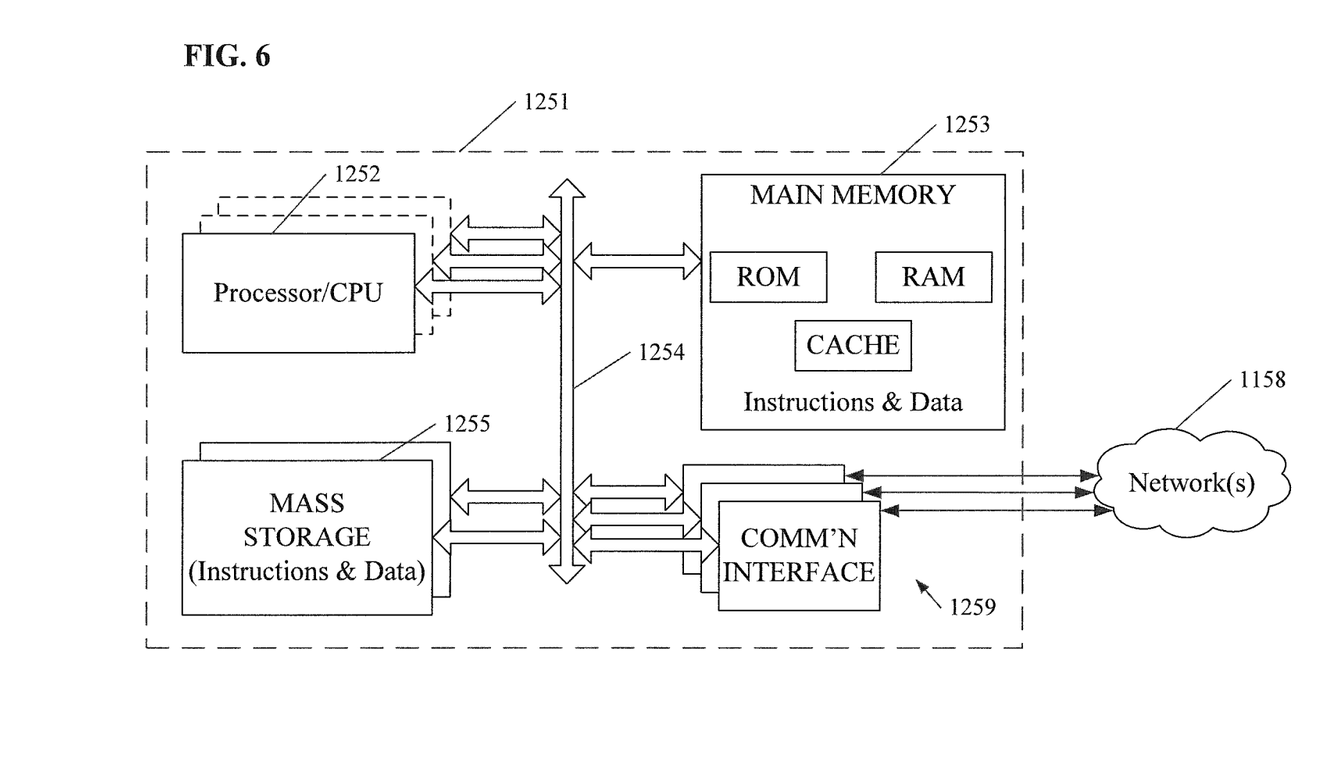
FIG. 6 is a simplified functional block diagram of a personal computer or other work station or terminal device.
Figure 7:
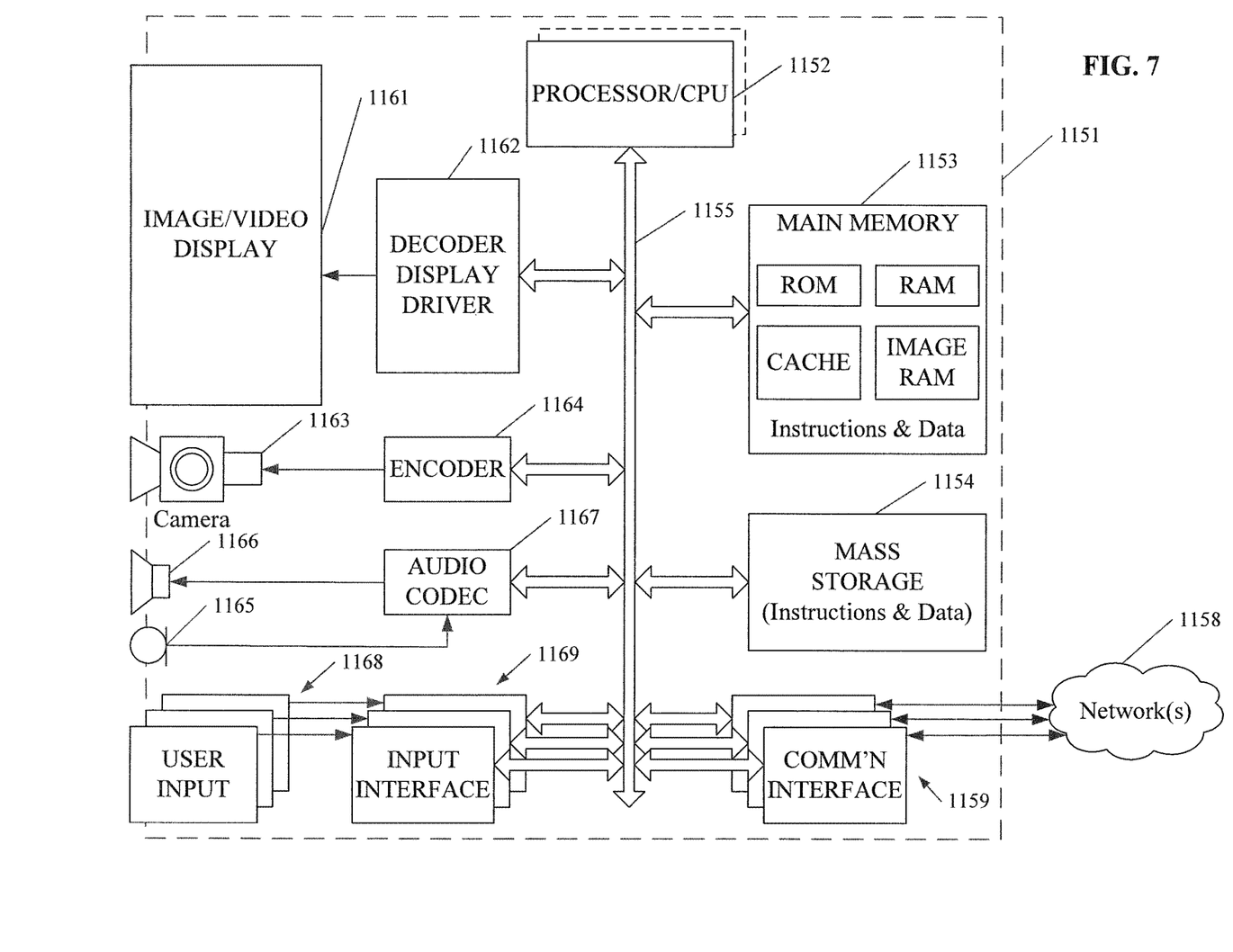
FIG. 7 is a simplified functional block diagram of a computer that may be configured as a host or server, for example, to function as the user system in the system of FIG. 4.

FIGS. 6 and 7 provide functional block diagram illustrations of general purpose computer hardware platforms. FIG. 6 depicts a computer with user interface elements, as may be used to implement a client computer or other type of work station or terminal device, although the computer of FIG. 6 may also act as a host or server if appropriately programmed. FIG. 7 illustrates a network or host computer platform, as may typically be used to implement a server.

With reference to FIG. 6, a user device type computer system 1151, which may serve as the user system 529, includes processor circuitry forming a central processing unit (CPU) 1152. The circuitry implementing the CPU 1152 may be based on any processor or microprocessor architecture such as a Reduced instruction set computing (RISC) using an ARM architecture, as commonly used today in mobile devices and other portable electronic devices, or a microprocessor architecture more commonly used in computers such as an instruction set architecture (ISA) or Complex instruction set computing (CISC) architecture. The CPU 1152 may use any other suitable architecture. Any such architecture may use one or more processing cores. The CPU 1152 may contain a single processor/microprocessor, or it may contain a number of microprocessors for configuring the computer system 1152 as a multi-processor system.

The computer system 1151 also includes a main memory 1153 that stores at least portions of instructions for execution by and data for processing by the CPU 1152. The main memory 1153 may include one or more of several different types of storage devices, such as read only memory (ROM), random access memory (RAM), cache and possibly an image memory (e.g. to enhance image/video processing). Although not separately shown, the memory 1153 may include or be formed of other types of known memory/storage devices, such as PROM (programmable read only memory), EPROM (erasable programmable read only memory), FLASH-EPROM, or the like.

The system 1151 also includes one or more mass storage devices 1154 (i.e., memory). Although a storage device 1154 could be implemented using any of the known types of disk drive or even tape drive, the trend is to utilize semiconductor memory technologies, particularly for portable or handheld system form factors. As noted, the main memory 1153 stores at least portions of instructions for execution and data for processing by the CPU 1152. The mass storage device 1154 provides longer term non-volatile storage for larger volumes of program instructions and data. For a personal computer, or other similar device example, the mass storage device 1154 may store the operating system and application software as well as content data, e.g. for uploading to main memory and execution or processing by the CPU 1152. Examples of content data include messages and documents, and various multimedia content files (e.g. images, audio, video, text and combinations thereof), Instructions and data can also be moved from the CPU 1152 and/or memory 1153 for storage in device 1154.

The processor/CPU 1152 is coupled to have access to the various instructions and data contained in the main memory 1153 and mass storage device 1154. Although other interconnection arrangements may be used, the example utilizes an interconnect bus 1155. The interconnect bus 1155 also provides internal communications with other elements of the computer system 1151.

The system 1151 also includes one or more input/output interfaces for communications, shown by way of example as several interfaces 1159 for data communications via a network 1158. The network 1158 may be or communicate with the network 525 of FIG. 5. Although narrowband modems are also available, increasingly each communication interface 1159 provides a broadband data communication capability over wired, fiber or wireless link. Examples include wireless (e.g. WiFi) and cable connection Ethernet cards (wired or fiber optic), mobile broadband 'aircards,' and Bluetooth access devices. Infrared and visual light type wireless communications are also contemplated. Outside the system 1151, the interface provide communications over corresponding types of links to the network 1158. In the example, within the system 1151, the interfaces communicate data to and from other elements of the system via the interconnect bus 1155.

For operation as a user terminal device, the computer system 1151 further includes appropriate input/output devices and interface elements. The example offers visual and audible inputs and outputs, as well as other types of inputs. Although not shown, the system may also support other types of output, e.g. via a printer. The input and output hardware devices are shown as elements of the device or system 1151, for example, as may be the case if the computer system 1151 is implemented as a portable computer device (e.g. laptop, notebook or ultrabook), tablet, smartphone or other handheld device. In other implementations, however, some or all of the input and output hardware devices may be separate devices connected to the other system elements via wired or wireless links and appropriate interface hardware.

For visual output, the computer system 1151 includes an image or video display 1161 and an associated decoder and display driver circuit 1162. The display 1161 may be a projector or the like but typically is a flat panel display, such as a liquid crystal display (LCD). The decoder function decodes video or other image content from a standard format, and the driver supplies signals to drive the display 1161 to output the visual information. The CPU 1152 controls image presentation on the display 1161 via the display driver 1162, to present visible outputs from the device 1151 to a user, such as application displays and displays of various content items (e.g. still images, videos, messages, documents, and the like).

In the example, the computer system 1151 also includes a camera 1163 as a visible light image sensor. Various types of cameras may be used. The camera 1163 typically can provide still images and/or a video stream, in the example to an encoder 1164. The encoder 1164 interfaces the camera to the interconnect bus 1155. For example, the encoder 164 converts the image/video signal from the camera 1163 to a standard digital format suitable for storage and/or other processing and supplies that digital image/video content to other element(s) of the system 1151, via the bus 1155. Connections to allow the CPU 1152 to control operations of the camera 1163 are omitted for simplicity.

In the example, the computer system 1151 includes a microphone 1165, configured to detect audio input activity, as well as an audio output component such as one or more speakers 1166 configured to provide audible information output to the user. Although other interfaces may be used, the example utilizes an audio coder/decoder (CODEC), as shown at 1167, to interface audio to/from the digital media of the interconnect bus 1155. The CODEC 1167 converts an audio responsive analog signal from the microphone 1165 to a digital format and supplies the digital audio to other element(s) of the system 1151, via the bus 1155. The CODEC 1167 also receives digitized audio via the bus 1155 and converts the digitized audio to an analog signal which the CODEC 1167 outputs to drive the speaker 1166. Although not shown, one or more amplifiers may be included to amplify the analog signal from the microphone 1165 or the analog signal from the CODEC 1167 that drives the speaker 1166.

Depending on the form factor and intended type of usage/applications for the computer system 1151, the system 1151 will include one or more of various types of additional user input elements, shown collectively at 1168. Each such element 1168 will have an associated interface 1169 to provide responsive data to other system elements via bus 1155. Examples of suitable user inputs 1168 include a keyboard or keypad, a cursor control (e.g. a mouse, touchpad, trackball, cursor direction keys etc.).

Another user interface option provides a touchscreen display feature. At a high level, a touchscreen display is a device that displays information to a user and can detect occurrence and location of a touch on the area of the display. The touch may be an actual touch of the display device with a finger, stylus or other object; although at least some touchscreens can also sense when the object is in close proximity to the screen. Use of a touchscreen display as part of the user interface enables a user to interact directly with the information presented on the display. The display may be essentially the same as discussed above relative to element 1161 as shown in the drawing. For touch sensing, however, the user inputs 1168 and interfaces 1169 would include a touch/position sensor and associated sense signal processing circuit. The touch/position sensor is relatively transparent, so that the user may view the information presented on the display 1161. The sense signal processing circuit receives sensing signals from elements of the touch/position sensor and detects occurrence and position of each touch of the screen formed by the display and sensor. The sense circuit provides touch position information to the CPU 1152 via the bus 1155, and the CPU 1152 can correlate that information to the information currently displayed via the display 1161, to determine the nature of user input via the touchscreen.

A mobile device type user terminal may include elements similar to those of a laptop or desktop computer, but will typically use smaller components that also require less power, to facilitate implementation in a portable form factor. Some portable devices include similar but smaller input and output elements. Tablets and smartphones, for example, utilize touch sensitive display screens, instead of separate keyboard and cursor control elements.

Each computer system 1151 runs a variety of applications programs and stores data, enabling one or more interactions via the user interface, provided through elements, and/or over the network 1158 to implement the desired user device processing for the embedded image generation service or the processing of 2D codes and images for generating embedded images. The user computer system/device 1151, for example, runs a computer application, such a web browser and/or a separate embedded image generation and/or color optimization application programs.

Turning now to consider a server or host computer, FIG. 7 is a functional block diagram of a general-purpose computer system 1251, which may perform the functions of the web (or data network) server 547, the network server 527, the user system 529 or the like. The web server 547 may manage or access the data storage 548 based on requests received via data network 545 and similarly the network server 527 may manage or access the data storage 548 based on requests received via network 525.

The example 1251 will generally be described as an implementation of a server computer, e.g. as might be configured as a blade device in a server farm. Alternatively, the computer system may comprise a mainframe or other type of host computer system capable of web-based communications, media content distribution, or the like via the network 1158. Although shown as the same network as served the user computer system 1151, the computer system 1251 may connect to a different network.

The computer system 1251 in the example includes a central processing unit (CPU) 1252, a main memory 1253, mass storage 1255 and an interconnect bus 1254. These elements may be similar to elements of the computer system 1151 or may use higher capacity hardware. The circuitry forming the CPU 1252 may contain a single microprocessor, or may contain a number of microprocessors for configuring the computer system 1252 as a multi-processor system, or may use a higher speed processing architecture. The main memory 1253 in the example includes ROM, RAM and cache memory; although other memory devices may be added or substituted. Although semiconductor memory may be used in the mass storage devices 1255, magnetic type devices (tape or disk) and optical disk devices typically provide higher volume storage in host computer or server applications. In operation, the main memory 1253 stores at least portions of instructions and data for execution by the CPU 1252, although instructions and data are moved between memory and storage and CPU via the interconnect bus in a manner similar to transfers discussed above relative to the system 1151 of FIG. 6.

The system 1251 also includes one or more input/output interfaces for communications, shown by way of example as interfaces 1259 for data communications via the network 23. Each interface 1259 may be a high-speed modem, an Ethernet (optical, cable or wireless) card or any other appropriate data communications device. To provide the embedded image generation service to a large number of users' client devices, the interface(s) 1259 preferably provide(s) a relatively high-speed link to the network 1158. The physical communication link(s) may be optical, wired, or wireless (e.g., via satellite or cellular network).

Although not shown, the system 1251 may further include appropriate input/output ports for interconnection with a local display and a keyboard or the like serving as a local user interface for configuration, programming or troubleshooting purposes. Alternatively, the server operations personnel may interact with the system 1251 for control and programming of the system from remote terminal devices via the Internet or some other link via network 1158.

The computer system 1251 runs a variety of applications programs and stores the data in data storage, such as data storage 528 or 548 for the embedded image generation service. One or more such applications enable generation of a QR code or other type of 2D code, the decoding of a QR code or other type of 2D code, the delivery of web pages and/or the generation of e-mail messages or the like for delivering one or more of a message of encoding in a QR code or other 2D code, the QR code or other 2D code encoded with the message, the graphic image, and the embedded image, which is the combination of the QR code or other 2D code encoded with the message and the graphic image. Those skilled in the art will recognize that the computer system 1251 may run other programs and/or host other web-based or e-mail based messaging services.

The example (FIG. 7) shows a single instance of a computer system 1251. Of course, the server or host functions may be implemented in a distributed fashion on a number of similar platforms, to distribute the processing load. Additional networked systems (not shown) may be provided to distribute the processing and associated communications, e.g. for load balancing or failover.

The hardware elements, operating systems and programming languages of computer systems like 1151, 1251 generally are conventional in nature, and it is presumed that those skilled in the art are sufficiently familiar therewith to understand implementation of the present embedded image generation techniques using suitable configuration and/or programming of such computer system(s) particularly as outlined above relative to 1151 of FIG. 6 and 1251 of FIG. 7.

Hence, aspects of the methods of generating an embedded image outlined above may be embodied in programming, e.g. in the form of software, firmware, or microcode executable by a user computer system, a server computer or other programmable device. Program aspects of the technology may be thought of as "products" or "articles of manufacture" typically in the form of executable code and/or associated data that is carried on or embodied in a type of machine readable medium. "Storage" type media include any or all of the tangible memory of the computers, processors or the like, or associated modules thereof, such as various semiconductor memories, tape drives, disk drives and the like, which may provide non-transitory storage at any time for the software programming. All or portions of the software may at times be communicated through the Internet or various other telecommunication networks. Such communications, for example, may enable loading of the software from one computer or processor into another, for example, from a management server or host computer of a 2D code generation and/or graphic image service provider into the computer platform of the user system that will be the network server and/or the computer platform of the user that will be the client device for embedded image generation service. Thus, another type of media that may bear the software elements includes optical, electrical and electromagnetic waves, such as used across physical interfaces between local devices, through wired and optical landline networks and over various air-links. The physical elements that carry such waves, such as wired or wireless links, optical links or the like, also may be considered as media bearing the software. As used herein, unless restricted to one or more of "non-transitory," "tangible" or "storage" media, terms such as computer or machine "readable medium" refer to any medium that participates in providing instructions to a processor for execution.

Hence, a machine readable medium may take many forms, including but not limited to, a tangible storage medium, a carrier wave medium or physical transmission medium. Non-volatile storage media include, for example, optical or magnetic disks, such as any of the storage devices in any computer(s) or the like, such as may be used to implement the processes of generating an embedded image, etc. shown in the drawings. Volatile storage media include dynamic memory, such as main memory of such a computer platform. Tangible transmission media include coaxial cables; copper wire and fiber optics, including the wires that comprise a bus within a computer system. Carrier-wave transmission media can take the form of electric or electromagnetic signals, or acoustic or light waves such as those generated during radio frequency (RF) and light-based data communications. Common forms of computer-readable media therefore include for example: a floppy disk, a flexible disk, hard disk, magnetic tape, any other magnetic medium, a CD-ROM, DVD or DVD-ROM, any other optical medium, punch cards paper tape, any other physical storage medium with patterns of holes, a RAM, a PROM and EPROM, a FLASH-EPROM, any other memory chip or cartridge, a carrier wave transporting data or instructions, cables or links transporting such a carrier wave, or any other medium from which a computer can read programming code and/or data. Many of these forms of computer readable media may be involved in carrying one or more sequences of one or more instructions to a processor for execution.

Program instructions may comprise a software or firmware implementation encoded in any desired language. Programming instructions, when embodied in machine readable medium accessible to a processor of a computer system or device, render computer system or device into a special-purpose machine that is customized to perform the operations specified in the program.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "a" or "an" does not, without further constraints, preclude the existence of additional identical elements in the process, method, article, or apparatus that comprises the element.

Unless otherwise stated, any and all measurements, values, ratings, positions, magnitudes, sizes, and other specifications that are set forth in this specification, including in the claims that follow, are approximate, not exact. They are intended to have a reasonable range that is consistent with the functions to which they relate and with what is customary in the art to which they pertain.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

In the foregoing specification, specific embodiments of the present example have been described. However, one of ordinary skill in the art appreciates that various modifications and changes can be made without departing from the scope of the present example as set forth in the claims below. Accordingly, the specification and figures are to be regarded in an illustrative rather than a restrictive sense, and all such modifications are intended to be included within the scope of present example. The benefits, advantages, solutions to problems, and any element(s) that may cause any benefit, advantage, or solution to occur or become more pronounced are not to be construed as a critical, required, or essential features or elements of any or all the claims. The example is defined solely by the appended claims including any amendments made during the pendency of this application and all equivalents of those claims as issued.

The invention claimed is:

1. A method of producing a set of QR codes with visual image information in a computing means, said method including the steps of:
   receiving data to encode, stored in a first memory of the computing means, and a set of images comprising a three dimensional array stored in a second memory of the computing means;
   generating a three dimensional array comprising a set of QR codes from the data stored in the first memory such that each QR code is represented as a matrix with M rows and N columns and a time index, wherein each element in each matrix is one of two unique values (binary);
   generating a second three dimensional array comprising a set of K matrices with M rows and N columns wherein each K matrix is related to a time index t and has L layers, each element in the second three dimensional array has coordinates row r, column c, time index t and each coordinate element is defined as a function of the set of images stored in the second memory;
   divide each of the K, M by N matrices into three dimensional sub-blocks of elements with m rows, n columns and depth equal to k elements, wherein m≤M, n≤N and k≤L;
   modify a sub-set of the element values of each image sub-block based upon the values of the corresponding QR code elements in the sub-block with the same element rows, columns and time index t;

inside each sub-block, define a subset of elements from each image sub block and replace them with the elements in the sub-set of each image sub-block modified based on the QR code sub block with the same row, column and time index coordinates; and wherein the modification of element values of the images stored in the second memory is derived by minimizing a visual cost function f(r,c,t) and by imposing a limit on a probability of decoding error, where r and c represent matrix row and column coordinates surrounding the subject element under consideration, and t represents the time index of the image within the set of images being considered, wherein the limit on the probability of decoding error is derived from a three dimensional array comprising a set of K priority matrices of M rows and N columns, and wherein the probability of decoding error is derived by: dividing the set of QR code matrices, the set of image matrices and the set of priority matrices in overlapping windows of P<M rows and Q<N columns and R<=k depth elements centered on the sub-blocks, and applying a function, representing the probability of decoding error, of the overlapping windows and n parameters $p_1$, $p_2$, $p_3$, $p_4$, ..., $p_n$, wherein application of the function uniquely determines the location and values of modified elements in the three dimensional image array.

2. The method of claim 1, wherein the three dimensional array stored in the second memory is a gray-scale image having a single scalar value for each element in the M by N matrix, wherein L=1.

3. The method of claim 1, wherein the three dimensional array stored in the second memory is a color image composed of a red, green, and blue scalar value for each element in the M by N by K array, wherein L=3.

4. The method of claim 1, wherein the three dimensional arrays stored in the second memory includes an alpha transparency layer of each graphic representation in a set of graphic representations.

5. The method of claim 1, wherein the sub-set of elements inside the sub-block of m rows and n columns and k depth is a set of K square matrices of d rows and d columns where d<m and d<n.

6. The method of claim 1, wherein the subset of elements adjusted in the three dimensional image matrix is distributed within the sub-block of m rows and n columns and depth k and whose location is determined by a predetermined ordering stored in a third memory.

7. A method of producing a set of QR codes with visual image information in a computing device, said method including the steps of:

receiving data to encode, stored in a first memory of the computing device, along with a set of images comprising a three dimensional array stored in a second memory of the computing device;

generating a three dimensional array comprising a set of QR codes from the data stored in the first memory such that each QR code is represented as a matrix with M rows and N columns and a time index and where each element is one of two unique values;

generating a second three dimensional array comprising a set of K matrices with M rows and N columns where each element in the set of K matrices is defined as a function of the set of images stored in the second memory and each K matrix is related to a time index t and has L layers;

divide each of the K, M by N matrices into three dimensional sub-blocks of elements with m rows, n columns and depth equal to k elements, wherein m≤M, n≤N, and k≤L;

converting the image elements of each image stored in the second memory to a scalar value that measures each element's visual appearance according to a visual cost function f(r,c,t) where r and c represent matrix row and column coordinates surrounding the subject element under consideration, and t represents the time index of the image within the set of images being considered;

modifying a subset of element values of each image matrix inside a sub-block based upon the values of the corresponding QR code elements in the sub-block with the same element rows, columns and time index;

inside each sub-block, define a subset of elements from each image sub-block and replace each sub-block with the elements in the sub-set of each image sub-block modified based on the QR code sub-block with the same row, column, and time index coordinates; and wherein the modification of element values of the images stored in the second memory is derived by minimizing the visual cost function f(r,c,t) and by imposing a limit on a probability of decoding error, wherein the limit on the probability of decoding error is derived from a three dimensional array comprising a set of K priority matrices of M rows and N columns, and wherein the probability of decoding error is derived by: dividing the set of QR code matrices, the set of image matrices and the set of priority matrices in overlapping windows of P<M rows and Q<N columns and R<=k depth elements centered on the sub-blocks, and applying a function, representing the probability of decoding error, of the overlapping windows and n parameters $p_1$, $p_2$, $p_3$, $p_4$, ..., $p_n$, wherein application of the function uniquely determines the location and values of modified elements in the three dimensional image array.

8. The method of claim 7, wherein the set of priority matrices is provided by a user.

9. The method of claim 7, wherein the set of priority matrices is derived from the image stored in the second memory.

10. The method of claim 7, wherein the parameters $p_1$, $p_2$ correspond to concentration of adjusted elements in the sub-blocks.

11. The method of claim 7, wherein the parameters $p_3$, $p_4$, ..., $p_n$ correspond to intensity parameters that determine how the intensity of modified elements is transformed.

12. The method of claim 7, wherein the probability of decoding error is composed as a linear combination of two components:

a probability of detection error defined as a probability of incorrectly sampling the center of the sub-blocks at a decoder; and a probability of binarization error defined as a probability of incorrectly detecting any element of the QR code matrix at the decoder.

13. The method of claim 7, wherein the visual cost function f(r,c,t) is derived as a function of the overlapping windows and the set of n parameters $p_1$, $p_2$, $p_3$, $p_4$, ..., $p_n$.

14. The method of claim 13, wherein two additional multivariate functions:

$g(p_1, p_2, p_3, p_4, ..., p_n)$ and $h(p_1, p_2, p_3, p_4, ..., p_n)$ enforce an inequality $g(p_1, p_2, p_3, p_4, ..., p_n)<0$ and an equality $h(p_1, p_2, p_3, p_4, ..., p_n)=0$ constraints.

15. The method of claim 7, wherein the visual cost function is obtained via a visual perception metric for video between the modified set of images and the original set of images.

16. The method of claim 7, wherein the visual cost function includes a distance metric in a perceptually uniform color space in order to determine a color difference between sub regions of the original set of image matrices and the adjusted set of image matrices.

17. A system, comprising:
a memory;
a processor, when executing programming code stored in the memory, configured to perform functions for combining image data with two dimensional (2D) code data, the functions including:
receiving data to encode, stored in a first memory of the system, along with a set of images comprising a three dimensional array stored in a second memory of the system;
generating a three dimensional array comprising a set of QR Codes from the data stored in the first memory such that each QR code is represented as a matrix with M rows and N columns and a time index and where each element is one of two unique values;
generating a second three dimensional array comprising a set of K matrices with M rows and N columns where each element is defined as a function of the set of images stored in the second memory and each K matrix is related to a time index t and has L layers;
dividing each of the K, M by N matrices into three dimensional sub-blocks of elements with m rows, n columns and depth equal to k elements;
converting the image elements of each image stored in the second memory to a scalar value that measure each element's visual appearance according to a visual cost function f(r,c,t) where r and c represent matrix row and column coordinates surrounding the subject element under consideration, and t represents a time index of the image within the set of images being considered;
modifying a subset of element values of each image matrix inside a subblock based upon the values of the corresponding QR code elements in the subblock with the same element rows, columns and time index;
inside each sub-block, define a subset of elements from each image sub-block and replace each sub-block with the elements in the sub-set of each image sub-block modified based on the QR code sub-block with the same row, column, and time index coordinates to provide an embedded time-based image; and
wherein the modification of element values of the images stored in the second memory is derived by minimizing the visual cost function f(r,c,t) and by imposing a limit on a probability of decoding error,
wherein the limit on the probability of decoding error is derived from a three dimensional array comprising a set of K priority matrices of M rows and N columns, and
wherein the probability of decoding error is derived by: dividing the set of QR code matrices, the set of image matrices and the set of priority matrices in overlapping windows of P<M rows and Q<N columns and R<=k depth elements centered on the sub-blocks, and applying a function, representing the probability of decoding error, of the overlapping windows and n parameters $p_1$, $p_2$, $p_3$, $p_4$, . . . , $p_n$, wherein application of the function uniquely determines the location and values of modified elements in the three dimensional image array.

18. The system of claim 17, further comprising:
a display device;
wherein the processor upon execution of programming code stored in the memory is further configured to perform functions, including functions to:
present the embedded time-based image on the display device.

* * * * *